May 3, 1927.

H. BOGAN

EGG PRESERVER

Filed July 13, 1925      2 Sheets-Sheet 1

Witnesses:
1. Mary Logan
2. Theresa McGill

Hans Bogan
INVENTOR.

BY A. B. McCall
ATTORNEY.

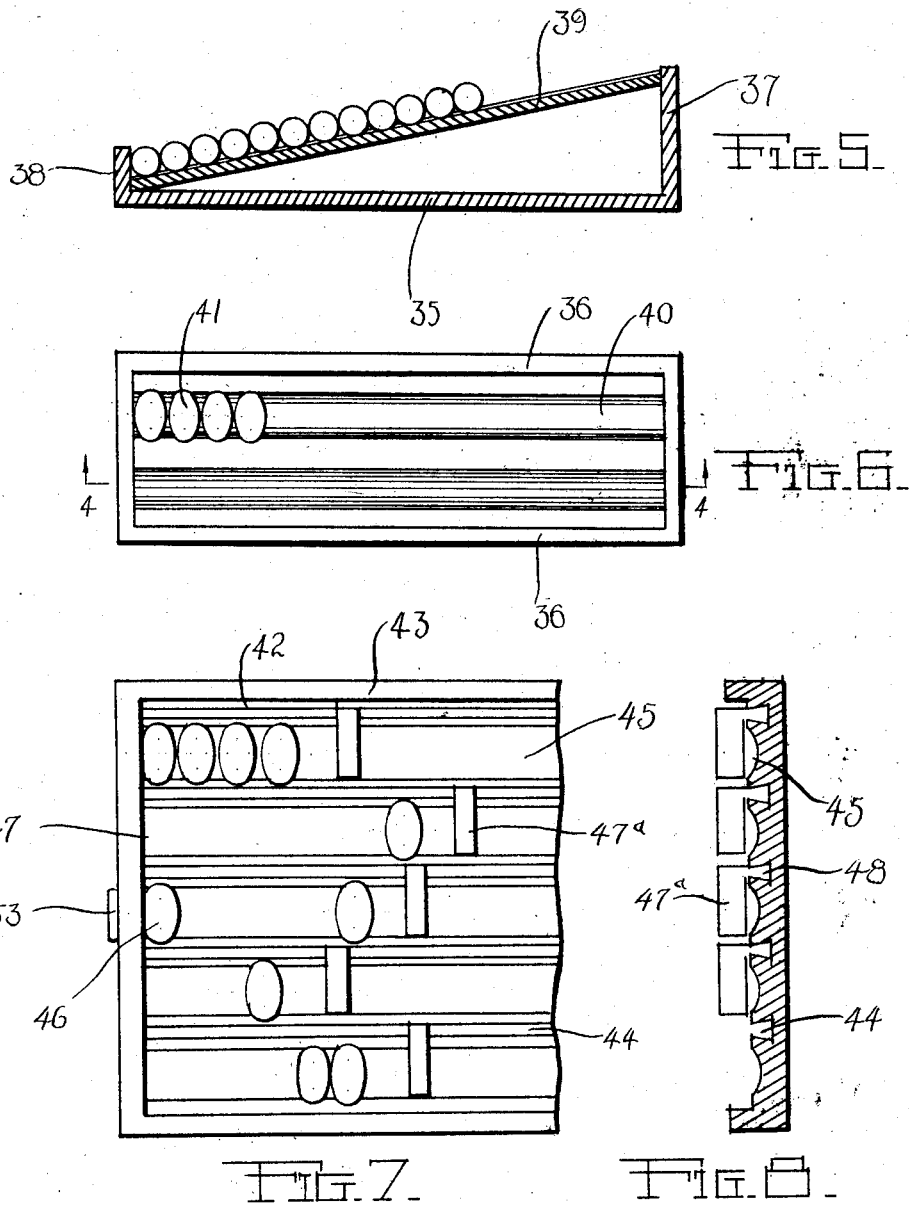

Patented May 3, 1927.

1,627,141

UNITED STATES PATENT OFFICE.

HANS BOGAN, OF SPRINGFIELD, ILLINOIS.

EGG PRESERVER.

Application filed July 13, 1925. Serial No. 43,231.

My invention relates to devices that may be adapted to use in prolonging the fresh state of eggs, an object being in this device not only to accomplish this result in a simple and economical manner but to do it in a way that will enable those who are taking care of eggs in storage in large quantities to take care of a great many eggs at a time.

My invention embodies a design and construction of egg preservers that is adapted to accommodate eggs in big quantities for storage and preservation and it will be found that my device combines the merits of strength and practical utility in the purpose for which it is designed, my device will keep eggs 4 to 6 weeks for hatching or a year in wholesome condition for food purposes.

A particular object of my invention therefore is to provide an egg preserver which in its construction includes means for turning the eggs periodically and all simultaneously, it being the preferred and intended purpose of the invention to have the device in operation within the confines of cold storage compartments.

Before attempting to point out the detail of construction and operation of my invention it may be well to explain the fact that the yolk of an egg is heavier than the white albumen that supports it and when an egg lays on one side for an extended period of time the heavier weight of the yolk causes it to settle down through the albumen until it comes in contact with the inner surface of the shell where it is subject to exposure to a certain amount of air which comes into the egg through the porous shell. Since the yolk of the egg is the fertile part of the egg and the albumen merely adapted to the protection of the yolk and since by laying in one position the yolk settles through the albumen and comes into contact with the shell and becomes exposed it is evident that in this way the yolk is subject to becoming spoiled and for food purposes becoming foul and unwholesome.

It is to prevent the yolk from settling through the albumen until it comes in contact with the shell that my device is adapted to operate and is particularly adapted to operate in rendering such careful protection to many eggs at a time.

It is a particular purpose of this egg preserver to provide a means whereby the eggs contained on the rack may be rolled approximately half their circumference so that a tilting of the rack causes these eggs which are stored on trays to be tilted from one position to another to accomplish a rolling of the eggs so that the yolk therein on one day lies with its weight urging in one direction against the liquid albumen within the shell and the next day the egg is turned and the yolk is turned so that its weight is removed from the former position and rests against another part of the albumen. Thus it will be seen that by a periodical change of position for the egg my device preserves the egg and prevents the yolk from coming into contact with the shell and in doing so is adapted to accommodate a plurality of eggs on a plurality of trays for convenience and economy in operation.

Another object of my device is to provide a tilting egg preserver mounted upon a rigid frame and having means for accomplishing the optional tilting of the rack to any desired angle or degree within predetermined tilting limit.

The above and other objects will become apparent in the description below in which characters of reference denote like named parts in the several drawings.

Referring briefly to the drawings which include two plates, Figure 1 is a perspective view of the tilting egg rack of my invention, the egg trays being omitted therefrom.

Figure 5 is a longitudinal sectional elevation view taken on line 4—4 of Figure 6, showing a simplified type of device adaptable for home use.

Figure 6 is the top plan view of Figure 5.

Figure 7 is the top plan view of the preferred type of egg carrying tray adapted to be used with the device shown in Figure 1.

Figure 8 is a cross sectional view of Figure 7.

Referring in detail to the drawings, numeral —10— indicates a rigid horizontal platform on which the entire device is adapted to be mounted. This platform is supported at its corners on legs —11— and at its side edges intermediate its length on a pair of posts —12— and —13— which extend vertically upward for the support of the rack that is adapted to support the eggs when tilted. At the upper and lower ends of the posts —12— and —13— a shaft —14— and —14ª— is anchored in said posts and adapted to span the distance between the two posts. Upon these shafts the entire egg carrying rack is mounted. This rack consists of a plurality of angle irons —15— and —16— which constitute the side framing members of the rack and are rounded and loosely joined at their ends to vertical corner rails —17—. These angle irons are so positioned as to present ledges which extend mutually toward each other to provide a raceway or support upon which the egg trays are adapted to be supported. The width of the space between the corner rails —17— at the ends are joined by iron rails —18— thus forming an integral rectangular skeleton frame upon which the egg trays are stored for any desired length of time. The bottom angle irons —16— and —17— are spanned by a plate —19— which is riveted to said angle irons at a predetermined position on one side of the posts —12— and —13— and is provided with a pivoted boss —20— which is adapted to loosely and pivotally register with an aperture in plate —19—. Said pivoted boss is threaded and adapted to operate on lifting screw —30—. This threaded and pivoted boss —20— is so positioned on plate —19— as to be able to prevent the binding of threads during the lifting or tilting operation in manipulating the rack.

Figure 2:
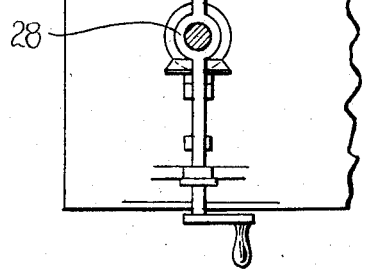
Figure 2 is a top or plan view of the tilting apparatus that is adapted to be operated in tilting the egg rack.
Figure 3:
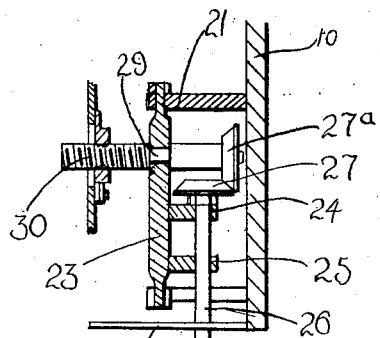
Figure 3 is a partially sectioned side elevation view of Figure 2.

The tilting mechanism illustrated in Figures 2 and 3 in detail is mounted beneath plate —19— upon the platform —10— between bearing brackets —21— and —22— which may be suitably shaped similar to an inverted V. A bar —23— extends across the distance between brackets —21— and —22— and has its ends journalled in said brackets, and collars are provided to rotatably fix said bar in position on said brackets. This bar has a pair of arms —24— and —25— extending downwardly through which a pair of aligned holes are formed. These aligned holes receive a shaft —26— which is rotatably mounted therein and has at its inner end a beveled gear —27— secured therein.

Intermediate the length of bar —23—, an annular ring —28— is formed through which a restricted portion —29— of the tilting screw —30— passes. The upper end of the tilting screw is threaded throughout its length from the restricted portion —29— to its outer end which projects upwardly. The lower end of the tilting screw is not provided with threads and extends downwardly beneath the bar —23— from the restricted portion —29— and has mounted on its lower end a beveled gear —27ª— which is adapted to lie in continual mesh with the beveled gear —27— mounted on the shaft —26—. The outer end of the shaft —26— passes through an arcuate slot —32— formed within a vertical guide plate —33— and has mounted thereon a crank handle —34— which when rotated causes the gear —27— to rotate the tilting screw to the medium of the gear —27ª—.

Figures 5 and 6 illustrate the simplest type of device that has heretofore been known to be used for turning eggs in numbers. This simple form consists of a box-like structure having a bottom —35— and side walls —36— which are joined at their ends with end walls —37— and —38—; the end wall —38— being lower than the opposite end wall —37—. Between the end walls —37— and —38— an inclined platform —39— is provided, said platform extending and rising gradually upward to a position near the upper end of the highest end wall —37—. On this platform, a pair of semi-oval grooves —40— are formed which extend lengthwise on the platform throughout its entire length. Into these grooves, eggs —41— are adapted to be placed.

Figure 1:
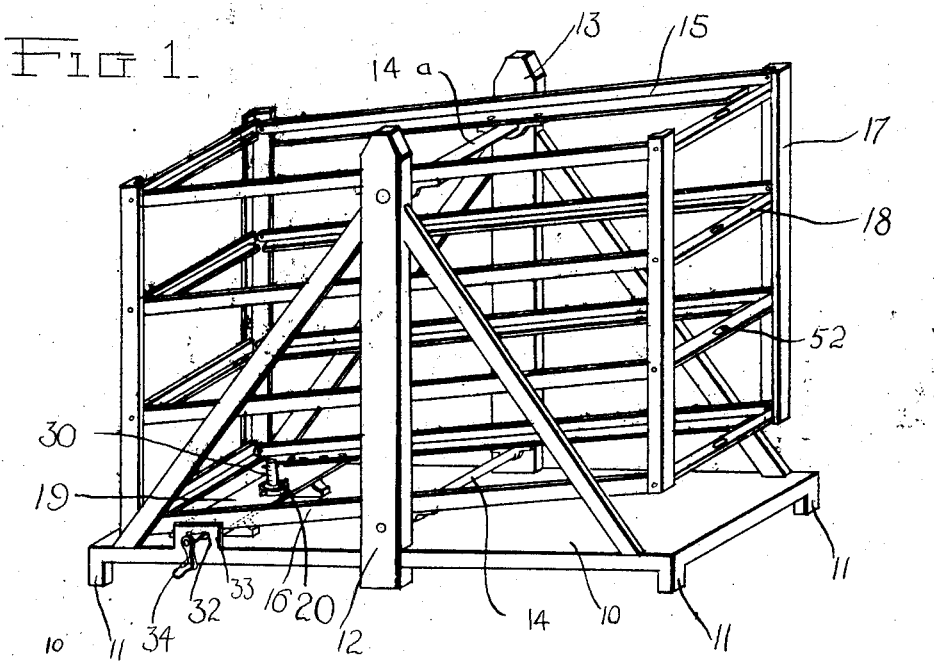

Figures 7 and 8 represent the type of egg tray used with the device illustrated in Figure 1 and is supported upon the rails —16—. This tray comprises a relatively flat longitudinal board —42— having a rim —43— bounding three sides thereof. At spaced-apart positions of the board, longitudinal channels —44— are formed. These channels have outwardly diverging walls having their greatest dimension at the bottom of the channels —44—. Adjacent each of these channels, a semi-oval groove —45— for holding the eggs deposited therein by the care taker. These eggs are placed in the trays from the marginal wall —47— outwardly and are retained in place thereon by stop plates —47ª— which have studs —48— at one end, said studs being of the same fitting dimensions and square in cross section as the channels —44— within which they register.

It will be observed that arrangements are provided in the structure of this rack for conveniently handling the egg trays in and out of the rack and it will also be observed that an arrangement is provided for slidably admitting the egg trays to the rack and holding the same detachably secured therein. At one end of the rack the members —18— are flat for admitting the trays and at the opposite ends in the form of an angle bar providing stop means for the tray.

Rack members —18— on the end of the rack are adapted to be flat and be so positioned as to enable the operator to easily slide an egg tray containing the eggs over this frame member. In this frame member —18— mid-way of its length is an aperture —52— providing holding means for the egg tray which has centrally disposed on the end thereof a holding pin —53— adapted to be dropped down into said aperture —52— in the frame member. This holding pin may be suitably held in position by a coil spring or other urging members for holding the same into engaged position.

Frame members —15— and —16— are adapted to be pivotally and loosely engaged with upright members —17— at their respective ends; said frame members in their pivoted condition being rounded on the end to easily permit a rotating or tilting movement.

By having frame members —15— and —16— loosely and pivotally engaged with the upright members —17— it will be observed that when the rack supporting the egg-trays is tilted that the upright members —17— will always remain in an upright or vertical position thus providing a perfect balance for the rack in all angles of its tilted position and it will be especially observed that by providing this convenience that there will be no sudden tilting or change of speed in the rate of tilting which might unfortunately cause trouble in handling big quantities of eggs; for the reason that it is very desirable to handle eggs quietly and carefully and avoid any unnecessary jars or shocks of any kind.

The device is used in the following manner: Eggs —46— are loaded on the tray —45— so that a space exists at one end of the tray which will permit the movement of all the eggs upon the tray a distance equal to half their circumference when the loaded end of the tray is tilted upwardly. The loaded egg trays are deposited upon the rails —15— and —16—. The tilting rack is supported and balanced upon the shaft —14— and —14ᵃ— which permits an equal angular movement of said rack on both sides of the posts —12— and —13—. This rack is tilted by rotation of the crank —34— which causes the shaft —26— to be rotated; and this shaft having a gear —27— thereon, which is in mesh with the gear —27ᵃ— on the bottom of the tilting spindle rotates the latter. This tilting spindle meshing in the boss —20— on plate —19— fixed beneath the rack and across it near one end thereof causes the rack to be moved upwardly or downwardly according to the rotation of the crank and thereby tilts the rack from a position shown in Figure 1 to its opposite extreme tilted position in which the corner posts on the right hand side of Figure 1 lie in contact with the surface of platform —10—.

Figure 4:
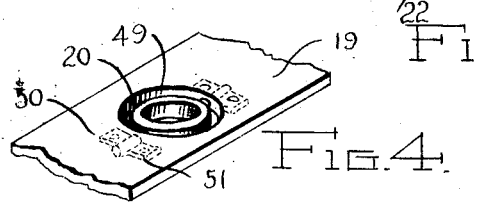
Figure 4 is a perspective showing how the pivoted and threaded collar operates in conjunction with the lifting threaded screw of the tilting apparatus and adapted to enable the lifting screw to elevate one end of the egg rack, it being evident that such an arrangement would be advisable in order to avoid the thread binding on the lifting screw during the tilting operation.

With reference to the lifting or tilting movement of the rack attention is called to the fact that boss —20— which is threaded is adapted to register centrally with the aperture —49— in plate —19— (see Figure 4, Plate —1—). Boss —20— is pivoted by spindles —50— and supported in normal position by bearings —51—. It will be noted that this construction eliminates any chance of thread binding during the lifting operation when the boss —20— rides the threaded lifting screw —30—.

The tray platforms —42— will slide upon the rails —16— in loading the rack illustrated in Figure —1— with eggs. These trays illustrated in Figures —7— and —8— are loaded with eggs by depositing the said eggs in grooves —45— therein, placing the eggs side by side, as illustrated in Figure —6—. The stop plates —47ᵃ— to which the studs —48— are fixed are then placed adjacent, each row of eggs in such a position that a space equal to ½ the circumference of the eggs exists between the stop plate and the outer egg of a row. These stop plates are prevented from rotating by providing studs —48— square in cross section so that when said studs are inserted into the grooves —44— these studs are held in place by friction. When the tilting rack is tilted from one position to another, the eggs will roll toward the stop plates —47ᵃ— or toward the retaining wall —47— according to the direction of the tilt of the rack. The rack when in the act of being tilted when loaded with trays causes the eggs —46— on the trays to roll toward the tilted end of the trays. The first row of eggs adjacent to space begins to roll into the spaces on the tray and the successive rows of eggs follow the first row in rolling toward this space, thus turning the eggs. The yolk which tends to settle toward the bottom through the albumen which is lighter than the yolk will then be rotated to a position that will permit its weight to fall back to the center of the albumen surrounding the yolk thus preventing the yolk from settling through the albumen to reach the egg shell which would expose the yolk to air through the porous shell.

In the simple type of egg transferring trays illustrated in Figures 5 and 6, the eggs will be deposited in the grooves —40— in the manner shown in Figure 5. When it is desired to roll these eggs, the lowermost egg —48— on the inclined platform —39— is lifted from place, thus permitting the entire row of eggs to roll downwardly on said platform for approximately one half of their circumference so that the yolk which previously settled toward the bottom position of the egg will be transferred to its position permitting its weight to rest upon the opposite portion of the albuminous content of the egg which surrounds the yolk. The lower egg in the row which has been removed from the platform —39— is then deposited by hand at the top of the row of eggs, care being taken preferably that in moving this egg its position also be changed to protect it in the same manner.

To those skilled in the art to which the proper care of eggs pertains it will be evident that the method of preserving eggs by such periodical changes in rotated position will be effective, but in the device of my invention I propose to accomplish such results in the preserving of eggs in a manner that will enable the operator to care for a plurality of eggs at a time the number being limited only by the quantity desired to be taken care of and the practical sizes of racks.

Having thus described the nature of my invention what I claim as new and useful and desire to secure by Letters Patent is:

A device of the class described comprising a platform, posts thereon, a shaft journalled on said posts, a rack balanced intermediate its length on said shaft, trays adapted to be supported on said rack, means for tilting said rack comprising a plate mounted on said rack, a tilting screw engaging a pivoted boss centrally disposed on said plate and rotatably mounted on said platform, and means for rotating said screw.

In witness whereof I hereunto set my hand this 13th day of June, A. D. 1925.

HANS BOGAN.